US006813565B1

United States Patent
Hu et al.

(10) Patent No.: US 6,813,565 B1
(45) Date of Patent: Nov. 2, 2004

(54) METHOD FOR GRADUALLY DEFORMING SEQUENTIAL SIMULATIONS OF A HETEROGENEOUS ENVIRONMENT SUCH AS AN UNDERGROUND ZONE

(75) Inventors: Lin-Ying Hu, Rueil-Malmaison (FR); Benoît Noetinger, Rueil-Malmaison (FR)

(73) Assignees: Institut Francais du Petrole, Rueil-Malmaison Cedex (FR); Total Final ELF S.A., Courbevoie (FR)

(*) Notice: Subject to any disclaimer, the term of this patent is extended or adjusted under 35 U.S.C. 154(b) by 228 days.

(21) Appl. No.: 09/786,232
(22) PCT Filed: Jun. 30, 2000
(86) PCT No.: PCT/FR00/01853
   § 371 (c)(1),
   (2), (4) Date: Mar. 2, 2001
(87) PCT Pub. No.: WO01/02876
   PCT Pub. Date: Nov. 1, 2001

(30) Foreign Application Priority Data

Jul. 2, 1999 (FR) .......................................... 99 08605

(51) Int. Cl.[7] .......................... G06F 19/00; G06F 17/10
(52) U.S. Cl. ............................................. 702/14; 703/2
(58) Field of Search .......................... 702/14, 2; 703/2; 367/73

(56) References Cited

U.S. PATENT DOCUMENTS 5,416,750 A * 5/1995 Doyen et al. ................. 367/73
5,764,515 A * 6/1998 Guerillot et al. ............... 702/2
5,838,634 A * 11/1998 Jones et al. .................... 367/73
6,618,695 B1 * 9/2003 Hu et al. ........................ 703/2

OTHER PUBLICATIONS

Hegstad et al., Uncertainty Assessment in History Matching and Forecasting, 1996, International Geostatistical Congress, Wollongong.*

Caers, Direct Sequential Indicator Simulation, Stanford University, Depart. of Petroleum Engineering, date is unknown.*

* cited by examiner

*Primary Examiner*—John Barlow
*Assistant Examiner*—Toan M. Le
(74) *Attorney, Agent, or Firm*—Antonelli, Terry, Stout & Kraus, LLP

(57) ABSTRACT

A method of gradual deformation of representations or realizations, generated by sequential simulation, not limited to a Gaussian stochastic model of a physical quantity z in a meshed heterogeneous medium, in order to adjust the model to a set of data relative to the structure or the state of the medium which are collected by previous measurements and observations. The method comprises applying a stochastic model gradual deformation algorithm to a Gaussian vector with N mutually independent variables which is connected to a uniform vector with N mutually independent uniform variables by a Gaussian distribution function so as to define realizations of the uniform vector, and using these realizations to generate representations of the physical quantity z that are adjusted to the data.

33 Claims, 6 Drawing Sheets

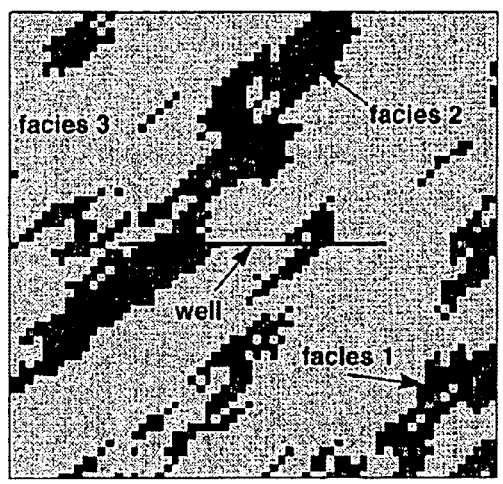
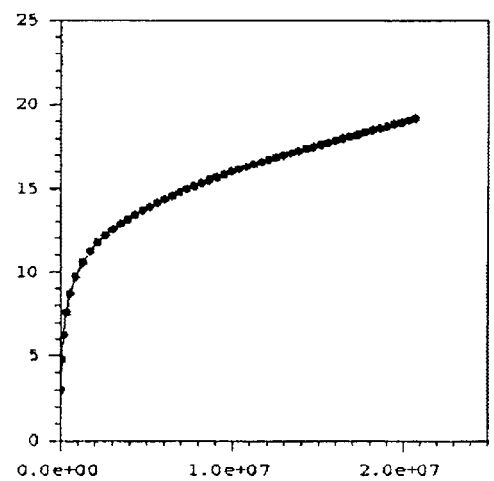
Fig. 1                    Fig.2
Fig.3A    Fig.3B    Fig.3C    Fig.3D    Fig.3E

METHOD FOR GRADUALLY DEFORMING SEQUENTIAL SIMULATIONS OF A HETEROGENEOUS ENVIRONMENT SUCH AS AN UNDERGROUND ZONE

BACKGROUND OF THE INVENTION

1. Field of the Invention

The present invention relates to a method of gradual deformation of representations or realizations, generated by sequential simulation, of a model of a heterogeneous medium which is not limited to a Gaussian stochastic model, based on a gradual deformation algorithm of Gaussian stochastic models.

2. Description of the Prior Art

In French patent application 98/09,018 a method is described which gradually deforms a stochastic (Gaussian type or similar) model of a heterogeneous medium such as an underground zone, constrained by a set of parameters relative to the structure of the medium. This method comprises drawing a number p (p=2. for example) of realizations (or representations) independent of the model or of at least part of the selected model of the medium from all the possible realizations and one or more iterative stages of gradual deformation of the model by performing one or more successive linear combinations of p independent initial realizations and then composite realizations are successively obtained possibly with new draws, etc., the coefficients of this combination being such that the sum of their squares is 1.

Gaussian or similar models are well-suited for modelling continuous quantity fields but are therefore ill-suited for modelling zones crossed by fracture networks or channel systems for example.

The most commonly used geostatistical simulation algorithms are those referred to as sequential simulation algorithms. Although sequential simulation algorithms are particularly well-suited for simulation of Gaussian models, these algorithms are not in principle limited to this type of model.

A geostatistical representation of an underground zone is formed for example by subdividing thereof by a network with N meshes and by determining a random vector with N dimensions $Z=(Z_1, Z_2, \ldots Z_N)$ best corresponding to measurements or observations obtained on the zone. As shown for example by Johnson, M. E.; in "Multivariate Statistical Simulation"; Wiley & Sons, New York, 1987, this approach reduces the problem of the creation of an N-dimensional vector to a series of N one-dimensional problems. Such a random vector is neither necessarily multi-Gaussian nor stationary. Sequential simulation of Z first involves the definition of an order according to which the N elements $(Z_1, Z_2, \ldots Z_N)$ of vector Z are generated one after the other. Apart from any particular case, it is assumed that the N elements of Z are generated in sequence from $Z_1$ to $Z_N$. To determine a value of each element $Z_i$, (i=1, ..., N), the following operations have to be carried out:

a) building the distribution of $Z_i$ conditioned by $(Z_1, Z_2, \ldots Z_{i-1})$ $F_c(Z_i)=P(Z_i \leq /Z_1, Z_2, \ldots Z_{i-1})$; and b) determining a value of Zi from distribution $F_c(Z_i)$.

In geostatistical practice, sequential simulation is frequently used to generate multi-Gaussian vectors and non-Gaussian indicator vectors. The main function of sequential simulation is to determine conditional distributions $F_c(Z_i)$ (i=1, ..., N). Algorithms and softwares for estimating these distributions are for example described in:

Deutsch, C. V. et al. "GSLIB (Geostatistical Software Library) and Useres Guide"; Oxford University Press, New York, Oxford 1992.

Concerning determining the values from distribution $F_c(Z_i)$, there also is a wide set of known algorithms.

The inverse distribution method is considered by means of which a realization of $Z_i$; $_i=F_c^{-1}(u_i)$ is obtained, where $u_1$ is taken from a uniform distribution between 0 and 1. A realization of vector Z therefore corresponds to a realization of vector U whose elements $U_1, U_2, \ldots, U_N$, are mutually independent and evenly distributed between 0 and 1.

It can be seen that a sequential simulation is an operation S which converts a uniform vector $U=(U_1, U_2, \ldots U_N)$ to a structured vector $Z=(Z_1, Z_2, \ldots, Z_N)$:

$$Z=S(U) \qquad (1).$$

The problem of the constraint of a vector Z to various types of data can be solved by constraining conditional distributions $F_c(Z_i)$ (i=1, ..., N) and/or uniform vector $U=(U_1, U_2, \ldots, U_N)$.

Recent work on the sequential algorithm was focused on improving the estimation of conditional distributions $F_c(z_i)$ by geologic data and seismic data integration. An article by Zhu, H. et al: "Formatting and Integrating Soft Data: Stochastic imaging via the Markov-Bayes Algorithm" in Soares, A., Ed. GeostaUstics Troia 92, vol.l: KiuwerAcad. Pubi., Dordrecht, The Netherlands, pp.1–12, 1993 is an example.

However, this approach cannot be extended to integration of non-linear data such as pressures from well tests and production records, unless a severe linearization is imposed. Furthermore, since any combination of uniform vectors U does not give a uniform vector, the method for gradual deformation of a stochastic model developed in the aforementioned patent application cannot be directly applied within the scope of the sequential technique described above.

The method according to the invention thus allows making the two approaches compatible, that is to extend the formalism developed in the aforementioned patent application to gradual deformation of realizations, generated by sequential simulation, of a model which is not limited to a Gaussian stochastic model.

SUMMARY OF THE INVENTION

The method allows gradual deformation of a representation or realization, generated by sequential simulation, of a model which is not limited to a Gaussian stochastic model of a physical quantity z in a heterogeneous medium such as an underground zone, in order to constrain the model to a set of data collected in the medium by previous measurements and observations relative to the state or the structure thereof.

The method of the invention comprises applying an algorithm of gradual deformation of a stochastic model to a Gaussian vector (Y) having a number N of mutually independent variables that is connected to a uniform vector (U) with N mutually independent uniform variables by a Gaussian distribution function (G), so as to define a chain of realizations u(t) of vector (U), and using these realizations u(t) to generate realizations z(t) of this physical quantity that are adjusted in relation to the (non-linear) data.

According to a first embodiment, the chain of realizations u(t) of uniform vector (U) is defined from a linear combination of realizations of Gaussian vector (Y) whose combination coefficients are such that the sum of their squares is one.

According to another embodiment, gradual deformation of a number n of parts of the model representative of the heterogeneous model is performed while preserving the continuity between these n parts of the model by subdividing uniform vector (U) into a number n of mutually independent subvectors.

The method of the invention finds applications in modeling underground zones which generates representations showing how a certain physical quantity is distributed in an underground zone (permeability z for example) and which is compatible in the best manner with observed or measured data: geologic data, seismic records, measurements obtained in wells, notably measurements of the variation with time of the pressure and of the flow rate of fluids from a reservoir, etc.

BRIEF DESCRIPTION OF THE DRAWINGS

Other features and advantages of the method according to the invention will be clear from reading the description hereafter of a non limitative example, with reference to the accompanying drawings wherein:

FIG. 1 shows the medial layer of a realization of a facies model used as a reference, generated by sequential simulation of indicatrices, FIG. 2 shows the variation with time of the pressure obtained in a well test for the reference model, FIGS. 3A to 3E respectively show five initial realizations of the medial layer of a reservoir zone, constrained only by the facies along the well, FIGS. 4A to 4E respectively show, for these five realizations, the bottomhole pressure curves in the reference model compared with those corresponding to the initial models, FIGS. 5A to 5E respectively show five realizations of the medial layer of the facies model conditioned to the facies along the well and adjusted in relation to the pressure curve obtained by well tests, FIGS. 6A to 6E respectively show, for the five realizations, the bottomhole pressure curves in the reference model compared with those corresponding to the adjusted models, FIGS. 7A to 7E respectively show how the objective functions respectively corresponding to these five examples vary with the number of iterations.

DETAILED DESCRIPTION OF THE INVENTION

Figure 4A:
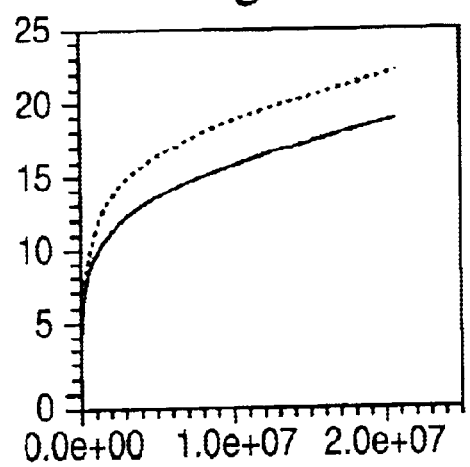

A study zone is considered that is subdivided by an N-mesh grid. Realizations or representations of a stochastic model of a certain physical quantity z representing for example the permeability of the formations in the zone are attempted to be made. The model that is sought must adjust to data obtained by measurements or observations at a certain Adjustment of a stochastic model to non-linear data can be expressed as an optimization problem. The quantity $f^{obs} = (f_1^{obs}, f_2^{obs}, f_3^{obs} \ldots f_p^{obs})$ designates the vector of the nonlinear data observed or measured in the studied medium (the reservoir zone), and the quantity $f=(f_1, f_2, f_3 \ldots f_p)$ is the corresponding vector of the responses of the stochastic model of the permeability $Z=(Z_1, Z_2, \ldots, Z_N)$. The problem of constraining the stochastic model of Z by observations consists in generating a realization z of Z which reduces to a rather low value an objective function that is defined as the sum of the weighted rms errors of the responses of the model in relation to the observations or measurements in the reservoir zone, i.e.:

$$O = \frac{1}{2}\sum_{i=1}^{p} \omega_i (f_1 - f_1^{obs})^2$$

where $\omega_i$, represents th weight assigned to respons $f_i$. Functions $f_i$ (i=1, 2, ..., p) and objective function O are functions of vector Z. This presents an optimization problem of dimension N.

In order to extend the formalism developed in the aforementioned patent application to the gradual deformation of realizations generated by, but not necessarily limited to Gaussian sequential simulation, a starting point is from a Gaussian vector with N variables $Y_i$, with i=1, 2, ..., N, mutually independent, of zero mean and of variance equal to 1, and N mutually independent uniform variables $U_1$, $U_2$, $U_3$, ... $U_N$ are defined by:

$$U_i = G(Y_i) \forall i=1, 2, \ldots, N$$

where G represents the standardized Gaussian distribution function.

Assuming this to be the case, the gradual deformation algorithm developed within a Gaussian frame is applied to the Gaussian vector $Y=(Y_1, Y_2, \ldots, Y_N)$ in order to build a continuous chain of realizations of uniform vector U ($U_1$, $U_2$, ..., $U_N$). Given two independent realizations $Y_a$ and $Y_b$ of Y, the chain of realizations u(t) of vector U obtained with the following relation is defined:

$$u(t) = G(y_a \cos t + y_b \sin t) \qquad (2).$$

For each t, u(t) is a realization of vector U. A vector z(t) which is, for each t, a realization of random vector Z is then obtained by sampling of the conditional distribution $F_c(z_i)$ (i=1, 2, ..., N) using the elements of vector u(t). Parameter t can consequently be adjusted as in the Gaussian case so as to adjust z(t) to non-linear data. This procedure is iterated until satisfactory adjustment is obtained.

Adjustment of a Facies Model to Pressure Data Obtained by Means of Well Tests

In order to illustrate application of the stochastic optimization method defined above, adjusting a stochastic reservoir model to pressure data obtained by means of well tests is attempted. Building of the reservoir model is derived from a real oil formation comprising three types of facies: two reservoir facies of good quality (facies 1 and 2) and a reservoir facies of very bad quality (facies 3). Table 1 defines the petrophysical properties of the three facies:

|  | $K_x$ (md) | $K_y$ (md) | $K_z$ (md) | $\phi$ (%) | $c_t$ ($10^{-5}$ bar$^{-1}$) |
|---|---|---|---|---|---|
| Facies 1 | 10 | 10 | 10 | 17 | 2.1857 |
| Facies 2 | 1 | 1 | 1 | 14 | 2.0003 |
| Facies 3 | 0.1 | 0.1 | 0.001 | 9 | 1.8148 |

In order to represent the specific facies distribution of the oil formation, a binary realization is first generated to represent fades 3 and its complement. Then, in the complementary part of facies 3, another binary realization independent of the first one is generated to represent facies 1 and 2. The formation is discretized by means of a regular grid pattern of 60×59×15 blocks 15 m×15 m×1.5m in size. An exponential variogram model is used to estimate the conditional distributions. The main anisotropy direction is diagonal in relation to the grid pattern. The ranges of the variogram of facies 3 in the three anisotropy directions are 300 m, 80 m and 3 m respectively. The ranges of the variogram of facies 1 and 2 in the three anisotropy directions are 150 m, 40 m and 1.5 m respectively. The proportions of facies 1, 2, 3 are 6%, 16% and 78% respectively.

A well test has been carried out by means of a finite-difference well test, simulator as described by: Blanc, G. et al: "Building Geostatistical Models Constrained by Dynamic Data—A Posteriori Constraints" in SPE 35478, Proc. NPF/SPE European 3D Reservoir Modelling Conference, Stavenger, Norway, 1996.

The medial layer of a realization used as the reference model for this validation can be seen in FIG. 1. The section of the well that has been drilled runs horizontally through the medial layer of the reservoir model along axis x. The diameter of the well is 7.85 cm, the capacity of the well is zero and the skin factors of facies 1, 2 and 3 are 0, 3 and 50 respectively. The synthetic well test lasts for 240 days with a constant flow rate of 5 m$^3$/day so as to investigate nearly the entire oil field. FIG. 2 shows the pressure variation with time.

The objective was to build realizations of the facies model constrained by the facies encountered along the well and by the pressure curve obtained during well testing. The objective function is defined as the sum of the rms differences between the pressure responses of the reference model and the pressure responses of the realization. Since the dynamic behavior of the reservoir model is mainly controlled by the contrast between the reservoir facies of good and bad quality, the binary realization used to generate facies 1 and 2 has been fixed first and only the binary realization used to generate facies 3 has been deformed for pressure data adjustment.

Figure 4B:
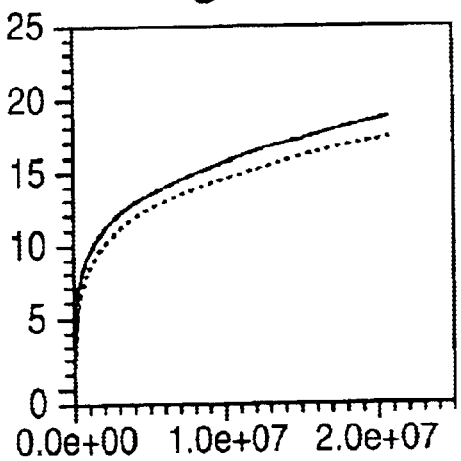
Figure 4C:
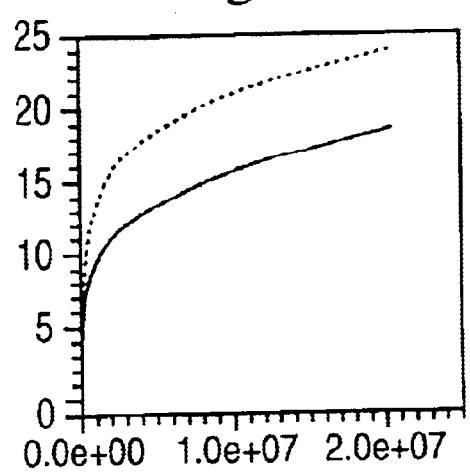
Figure 4D:
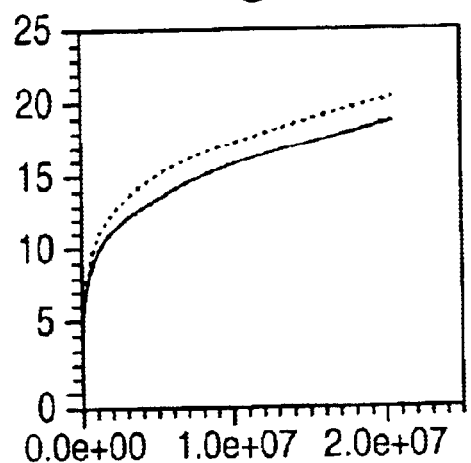
Figure 4E:
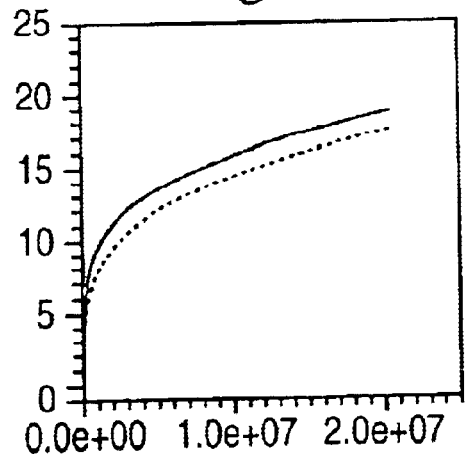
Figures 5A, 5B, 5C, 5D, 5E:
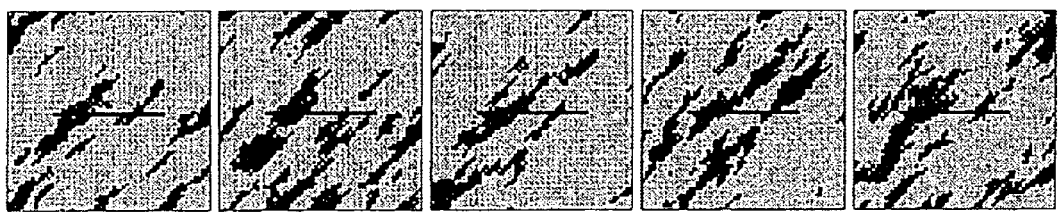
Figure 6A:
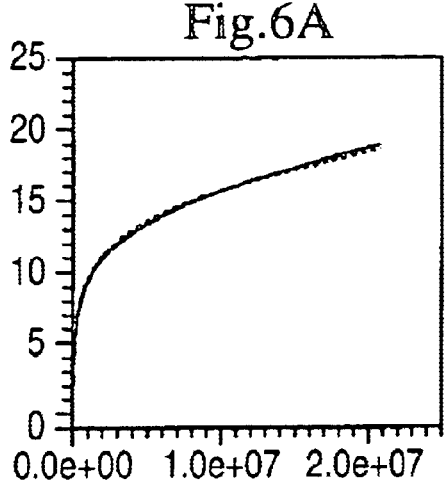
Figure 6B:
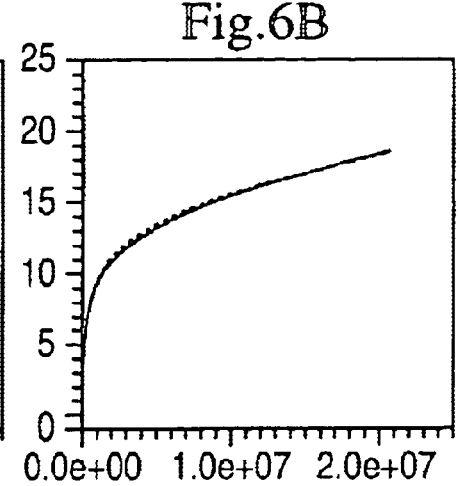
Figure 6C:
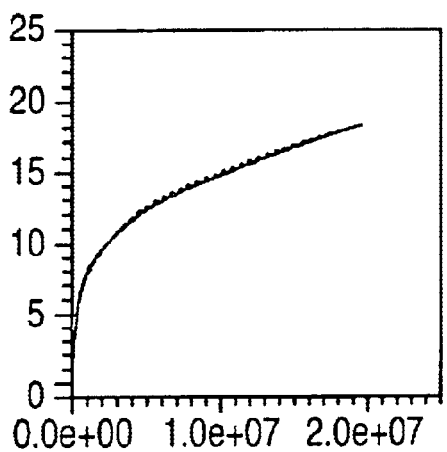
Figure 6D:
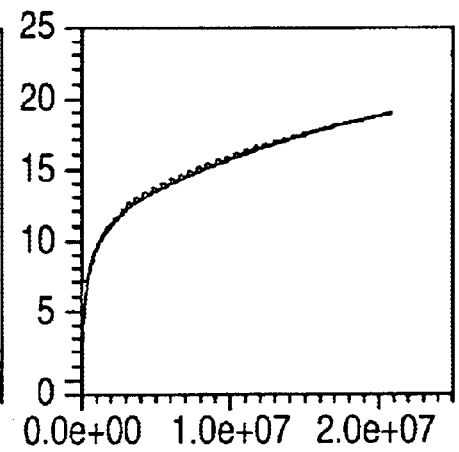
Figure 6E:
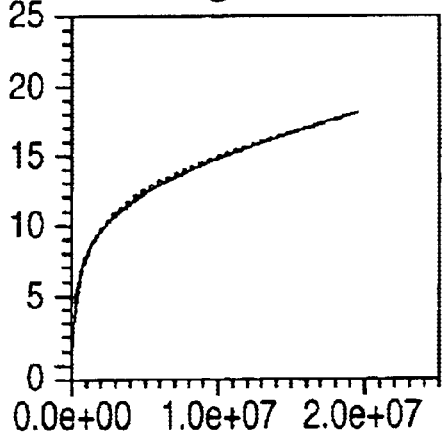
Figure 7A:
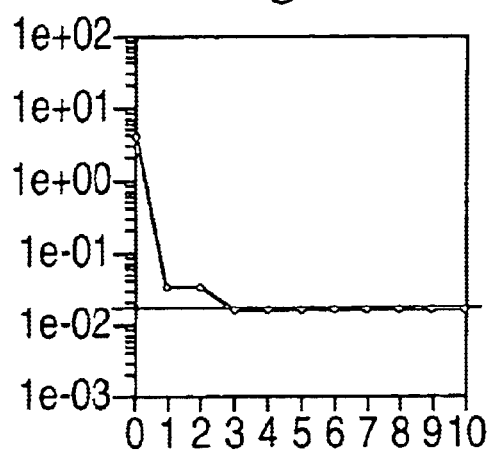
Figure 7B:
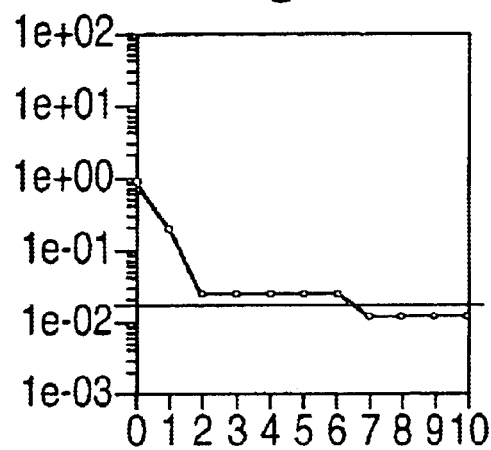
Figure 7C:
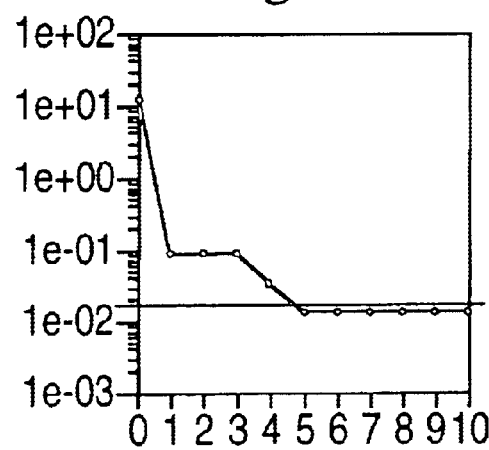
Figure 7D:
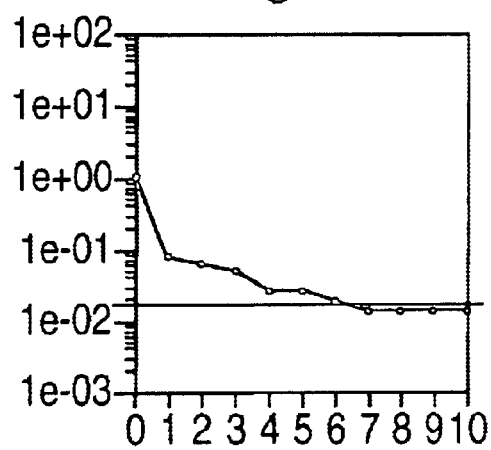
Figure 7E:
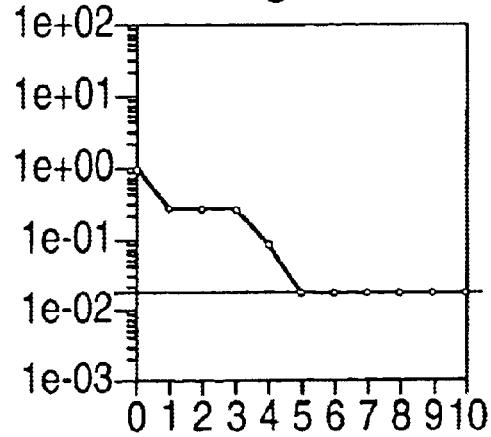

The pressure responses resulting from the well tests for the five realizations of FIGS. 3A to 3E are different from that of the reference model, as shown in FIGS. 4A to 4E. Starting respectively from these 5 independent realizations, by using the iterative adjustment method above, after several iterations, five adjusted are obtained realizations (FIGS. 5A to 5E) for which the corresponding pressure curves are totally in accordance with those of the reference model, as shown in FIGS. 6A to 6E.

Gradual Deformation in Relation to the Structural Parameters

Figures 8A, 8B, 8C, 8D, 8E:
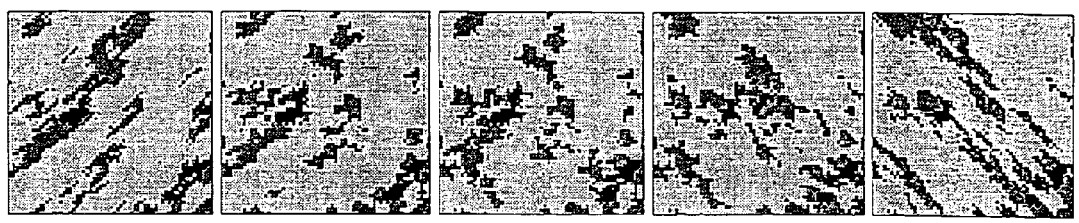
FIGS. 8A to 8E show the gradual deformations generated by an anisotropy coefficient change on a three-facies model generated by sequential simulation of indicatrices.

In many cases, sufficient data for deducing the structural parameters of the stochastic model: mean, variance, covariance function, etc., are not available. These structural parameters are often given in terms of a priori intervals or distributions. If their values are wrong, it is useless to seek a realization adjusted to non-linear data, It is therefore essential for applications to be able to perform a gradual deformation of a realization with simultaneous modification of random numbers and structural parameters. The sequential simulation algorithm defined by equation (1) makes possible changing, simultaneously or separately, a structural operator S and a uniform vector U. FIGS. 8A to 8E show the gradual deformations obtained for a fixed realization of uniform vector U when the anisotropy coefficient is changed.

Local or Regionalized Gradual Deformation

When the observations are spread out over different zones of a studied formation, an adjustment using global deformation would be ineffective because the improvement obtained in a zone could deteriorate the improvement in another zone. It is therefore preferable to apply gradual deformations zone by zone. Consider a subdivision of vector U into a certain number n of mutually independent subvectors $U^1, U^2, \ldots, U^n$, which allows performing their gradual deformation individually. Separate application of the gradual deformation algorithm to each subvector $U^1, U^2, \ldots, U^n$ allows obtaining a function of dimension n of uniform vector U:

$$U(t_1, t_2, \ldots, t_n) = \begin{bmatrix} U^1(t_1) \\ U^2(t_2) \\ \vdots \\ U^n(t_n) \end{bmatrix} = \begin{bmatrix} G(Y_a^1 \cos t_1 + Y_b^1 \sin t_1) \\ G(Y_a^2 \cos t_2 + Y_b^2 \sin t_2) \\ \vdots \\ G(Y_a^n \cos t_n + Y_b^n \sin t_n) \end{bmatrix}$$

where $Y^i_a$ and $Y^i_b$ for any i=1, 2, . . . , n, are independent Gaussian subvectors. For a set of realizations of $V^i_a$, and $v^i_b$, a problem of optimization of n parameters $t_1, t_2, \ldots, t_n$ is solved to obtain a realization that improves or maintains the data adjustment This procedure can be iterated until satisfactory adjustment is obtained.

Gradual local deformations thus allow significant improvement of the adjustment speed in all the cases where measurements or observations are spread out over different zones of the medium.

Figures 9A, 9B, 9C, 9D, 9E:
FIGS. 9A to 9E show the local gradual deformations of a three-facies model, generated by sequential simulation of indicatrices.

The effect of this gradual local deformation on the three-facies model of FIGS. 9A to 9E can be clearly seen therein where only the enclosed left lower part is affected.

The method according to the invention can be readily generalized to gradual deformation of a representation or realization of any stochastic model since generation of a realization of such a stochastic model always comes down to generation of uniform numbers.

What is claimed is:

1. A method for forming a representation generated by sequential simulation, of a stochastic model, which is not limited to a Gaussian stochastic model, of a physical quantity z in a heterogeneous medium, in order to constrain the stochastic model to data collected in the heterogeneous medium by means of previous measurements and observations, relative to a state or the structure of the heterogeneous medium, comprising applying a stochastic model gradual deformation algorithm to a Gaussian vector (Y) with N mutually independent variables that is connected to a uniform vector U with N mutually independent uniform variables by a Gaussian distribution function (G), so as to form a chain of realizations u(t) of vector U, and using the chain of realizations u(t) to generate realizations z(t) of the physical quantity that are adjusted to the data with.

2. A method as claimed in claim 1, wherein:
the chain of realizations u(t) of the vector (U) is defined from a linear combination of realizations of the Gaussian vector (Y) comprising combination coefficients with a sum of squares of the coefficients being one.

3. A method as claimed in claim 1, comprising:
gradually deforming the stochastic model, which is not limited to a Gaussian stochastic model representative of the heterogeneous medium, simultaneously in relation to the structural parameters and to random numbers.

4. A method as claimed in claim 2, comprising
gradually deforming the stochastic model, which is not limited to a Gaussian stochastic model representative of the heterogeneous medium, simultaneously in relation to the structural parameters and to random numbers.

5. A method as claimed in claim 1, comprising:
performing a separate gradual deformation of a number n of parts of the stochastic model, which is not limited to a Gaussian stochastic model representative of the heterogeneous medium, while preserving continuity between the parts of the stochastic model, not limited to a Gaussian stochastic model representative of the heterogeneous medium by subdividing the uniform vector U into n mutually independent subvectors.

6. A method as claimed in claim 2, comprising:
performing a separate gradual deformation of a number n of parts of the stochastic model, which is not limited to a Gaussian stochastic model representative of the heterogeneous medium, while preserving continuity between the parts of the stochastic model, not limited to a Gaussian stochastic model representative of the heterogeneous medium by subdividing the uniform vector U into n mutually independent subvectors.

7. A method as claimed in claim 3, comprising:
performing a separate gradual deformation of a number n of parts of the stochastic model, which is not limited to a Gaussian stochastic model representative of the heterogeneous medium, while preserving continuity between the parts of the stochastic model, not limited to a Gaussian stochastic model representative of the heterogeneous medium by subdividing the uniform vector U into n mutually independent subvectors.

8. A method as claimed in claim 4, comprising:
performing a separate gradual deformation of a number n of parts of the stochastic model, which is not limited to a Gaussian stochastic model representative of the heterogeneous medium, while preserving continuity between the parts of the stochastic model, not limited to a Gaussian stochastic model representative of the heterogeneous medium by subdividing the uniform vector U into n mutually independent subvectors.

9. A method in accordance with claim 1, wherein:
the heterogeneous medium is an underground zone.

10. A method in accordance with claim 2, wherein:
the heterogeneous medium is an underground zone.

11. A method in accordance with claim 3, wherein:
the heterogeneous medium is an underground zone.

12. A method in accordance With claim 4, wherein:
the heterogeneous medium is an underground zone.

13. A method in accordance with claim 5 wherein:
the heterogeneous medium is an underground zone.

14. A method in accordance with claim 6, wherein:
the heterogeneous medium is an underground zone.

15. A method in accordance with claim 7, wherein:
the heterogeneous medium is an underground zone.

16. A method in accordance with claim 8, wherein:
the heterogeneous medium is an underground zone.

17. A method for forming a representation generated by sequential simulation, of a stochastic model, not limited to a Gaussian stochastic model, of a physical quantity in a heterogeneous underground formation, which is defined by a set of data collected in the underground formation by means of previous measurements and observations, comprising:
a) applying a stochastic model gradual deformation algorithm to a Gaussian vector with mutually independent variables that is connected to a uniform vector with mutually independent uniform variables by a Gaussian distribution function, so as to form a chain of realizations u of the Gaussian vector;
b) using the chain of realizations u to generate representations of the physical quantity;
c) iteratively modifying an objective function that measures misfit between data corresponding to representations of the stochastic model representing the physical quantity, and the data collected in the underground formation until obtaining a representation of the underground formation substantially fitting the data with.

18. A method as claimed in claim 17, wherein:
a chain of realizations u of the uniform vector is defined from a linear combination of realizations of the Gaussian vector with the combination coefficients such that a sum of squares of the coefficients is one.

19. A method as claimed in claim 17, comprising:
gradually deforming the stochastic model representative of the underground formation with simultaneously modifying structural parameters of the stochastic model and random numbers.

20. A method as claimed in claim 18, comprising:
gradually deforming the stochastic model representative of the underground formation with simultaneously modifying structural parameters of the stochastic model and random numbers.

21. A method as claimed in claim 17, comprising:
performing a separate gradual deformation of a number n of parts of the stochastic model representative of the heterogeneous medium while preserving continuity between the number of parts of the stochastic model by subdividing the uniform vector into n mutually independent subvectors.

22. A method as claimed in claim 18, comprising:
performing a separate gradual deformation of a number n of parts of the stochastic model representative of the heterogeneous medium while preserving continuity between the number of parts of the stochastic model by subdividing the uniform vector into n mutually independent subvectors.

23. A method as claimed in claim 19, comprising:
performing a separate gradual deformation of a number n of parts of the stochastic model representative of the heterogeneous medium while preserving continuity between the number of parts of the stochastic model by subdividing the uniform vector into n mutually independent subvectors.

24. A method as claimed in claim 1 wherein:
the physical quantity is permeability of the underground formation.

25. A method as claimed in claim 1 wherein:
the measurements comprise geologic data.

26. A method as claimed in claim 1 wherein:
the measurements comprise seismic data.

27. A method as claimed in claim 1 wherein:
the measurements from wells in the heterogeneous medium comprise seismic data.

28. A method as claimed in claim 27 wherein:
the measurements obtained from wells comprise time variation of pressure and flow rate of fluid from a reservoir.

29. A method as claimed in claim 17 wherein:
the physical quantity is permeability of the underground formation.

30. A method as claimed in claim 17 wherein:
the measurements comprise geologic data.

31. A method as claimed in claim 17 wherein:
the measurements comprise seismic data.

32. A method as claimed in claim 17 wherein:
the measurements from wells in the heterogeneous medium comprise seismic data.

33. A method as claimed in claim 32 wherein:
the measurements obtained from wells comprise time variation of pressure and flow rate of fluid from a reservoir.

* * * * *